United States Patent
Cheng et al.

(10) Patent No.: US 7,787,549 B2
(45) Date of Patent: Aug. 31, 2010

(54) IMPULSIVE NOISE SUPPRESSOR AND METHOD THEREOF

(75) Inventors: Shin-Shiuan Cheng, Sinshih Township, Tainan County (TW); Yen-Wen Yang, Sinshih Township, Tainan County (TW); Kuo-Shih Tsai, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 835 days.

(21) Appl. No.: 11/698,278

(22) Filed: Jan. 26, 2007
(Under 37 CFR 1.47)

(65) Prior Publication Data
US 2007/0258549 A1 Nov. 8, 2007

(30) Foreign Application Priority Data
Jan. 27, 2006 (TW) .............................. 95103564 A

(51) Int. Cl.
*H04K 1/10* (2006.01)
*H04L 27/28* (2006.01)
(52) U.S. Cl. ................... 375/260; 375/316; 375/340; 375/345
(58) Field of Classification Search ............... 375/260, 375/345, 316, 340
See application file for complete search history.

(56) References Cited

U.S. PATENT DOCUMENTS

2003/0099287 A1* 5/2003 Arambepola .............. 375/227
2007/0030913 A1* 2/2007 Lin ............................ 375/260

\* cited by examiner

*Primary Examiner*—Ted M Wang
(74) *Attorney, Agent, or Firm*—Rabin & Berdo, P.C.

(57) ABSTRACT

An impulsive noise suppresser and method thereof is provided. The impulsive noise suppresser includes an automatic gain control unit, variable gain amplification unit, impulsive detection unit and impulsive suppression unit. The automatic gain control unit determines a gain value according to a PAPR. The variable gain amplification unit amplifies a reception signal by the gain value. The gain value is determined such that the amplified reception signal as unaffected by the impulsive noise can have an amplitude range smaller than a predetermined range. The impulsive detection unit is coupled to the variable gain amplification unit for determining whether the amplified reception signal is larger than a maximum value of the predetermined range and outputting an impulsive alarm signal if the reception signal is larger than the maximum value. The impulsive suppression unit suppresses the impulsive noise as receiving the impulsive alarm signal, and then outputs an output signal.

16 Claims, 2 Drawing Sheets

IMPULSIVE NOISE SUPPRESSOR AND METHOD THEREOF

This application claims the benefit of Taiwan application Serial No. 95103564, filed Jan. 27, 2006, the subject matter of which is incorporated herein by reference.

BACKGROUND OF THE INVENTION

1. Field of the Invention

The invention relates in general to a detection apparatus, and more particularly to an impulsive noise detection apparatus, which is applied to a digital television receiver, and method thereof.

2. Description of the Related Art

A digital television system can transmit more channels of high-quality programs and have better resistibility for multi-path interference than an analog television system due to application of a digitalized compression signal, thereby reducing image shadows and improving frame quality. The digital television system has various specifications, such as digital video broadcast (DVB) of European specification, advanced television systems committee (ATSC) of American specification and integrated services digital broadcasting (ISDB) of Japanese specification.

In a transition period when the analog television system is transformed to the digital television system, a normal-family TV is equipped with a top-box embedded with a digital television receiver for receiving signals of digital TV programs. However, there exist many impulsive noise sources affecting the signals of digital TV programs in houses and thus reducing their frame quality.

The impulsive noise comes from, for example, electronic products, such as a refrigerator, television and microwave oven in our houses. Therefore, it is an essential subject for industrials of digital television receiver to reduce impulsive noise interference.

SUMMARY OF THE INVENTION

The invention is directed to an impulsive noise suppresser and method thereof, applied to a digital television receiver.

According to a first aspect of the present invention, an impulsive noise suppresser is provided. The impulsive noise suppresser includes an automatic gain control unit, variable gain amplification unit, impulsive detection unit and impulsive suppression unit. The automatic gain control unit is for determining a gain value according to a peak-to-average power ratio (PAPR). The variable gain amplification unit is for amplifying a reception signal by using the gain value, wherein the gain value is determined such that the amplified reception signal as unaffected by the impulsive noise can have an amplitude range smaller than a predetermined range. The impulsive detection unit is coupled to the variable gain amplification unit for determining whether the amplified reception signal is larger than a maximum value of the predetermined range and outputting an impulsive alarm signal if the reception signal is larger than the maximum value. The impulsive suppression unit is for receiving the amplified reception signal, eliminating the impulsive noise and outputting an output signal as receiving the impulsive alarm signal.

According to a second aspect of the present invention, a method for suppressing impulsive noise is disclosed, which is applied to a digital television receiver. The method includes estimating a PAPR and accordingly determining a gain value according to a predetermined feature of a reception signal; receiving a reception signal; amplifying the reception signal by the gain value, wherein the gain value is determined such that the amplified reception signal can have an amplitude range smaller than a predetermined range under an ideal condition that the reception signal is not affected by the impulsive noise; determining whether the amplified reception signal is larger than a maximum value of the predetermined range and outputting an impulsive alarm signal when the amplified signal is larger than the maximum value; and suppressing the impulsive noise when receiving the impulsive alarm signal and outputting an output signal.

The invention will become apparent from the following detailed description of the preferred but non-limiting embodiments. The following description is made with reference to the accompanying drawings.

DETAILED DESCRIPTION OF THE INVENTION

Figure 1:
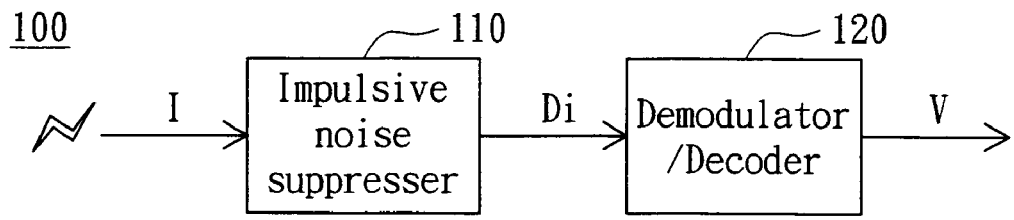
FIG. 1 is a block diagram of a digital television receiver according to a preferred embodiment of the invention.

Referring to FIG. 1, a block diagram of a digital television receiver according to a preferred embodiment of the invention is shown. A digital television receiver 100 receives and decodes a signal I of DVB-T specification and then outputs the decoded signal I to a television. In terms of a standard European specification DVB-T, a digital-television signal is transmitted by using an orthogonal frequency division multiplexing (OFDM) technique, and the related peak-to-average power ratio (PAPR) is estimated beforehand according to a feature of the received signal. In the embodiment, amplification gain of the signal I is determined by the PAPR for detecting whether the received signal I is affected by impulsive noise.

The digital television receiver 100 includes an impulsive noise suppresser 110 and a demodulator/decoder 120. The impulsive noise suppresser 110 detects whether the received signal I of digital television is affected by impulsive noise. If yes, the impulsive noise thereof is eliminated to generate a digital input signal Di, and if no, the signal I is directly converted to the digital input signal Di. The demodulator/decoder 120 after receiving the digital input signal Di, performs a demodulating/decoding processing on the digital input signal Di and outputs a video/audio signal V for TV playback.

Figure 2:
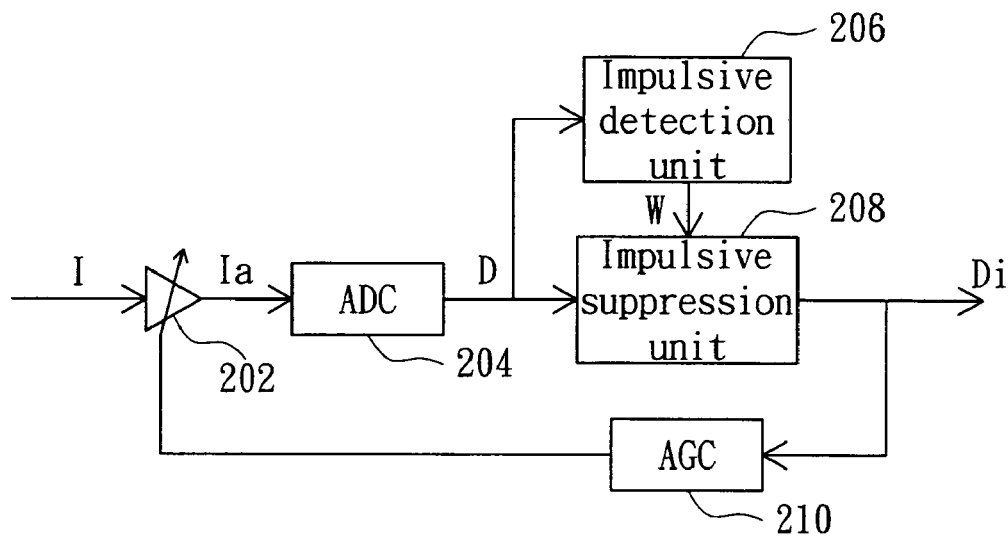
FIG. 2 shows a block diagram of an impulsive noise suppresser.

FIG. 2 shows a block diagram of an impulsive noise suppresser. An impulsive noise suppresser 110 includes an automatic gain controller (AGC) 210, a variable gain amplifier (VGA) 202, an analog-to-digital converter (ADC) 204, an impulsive detection unit 206 and an impulsive suppression unit 208. The AGC 210 adjusts a gain value of the VGA 202 according to a PAPR and the PAPR is estimated beforehand in accordance with the feature of a received signal. The VGA 202 generates an amplified input signal Ia according to the gain value and the gain value is determined such that the maximum range of the amplified input signal Ia as unaffected in an ideal condition is smaller than a predetermined range, and the predetermined range is smaller than a maximum dynamic input range of the ADC 204. The ADC 204 converts the amplified input signal Ia to a digital signal D.

The digital signal D is inputted simultaneously into the impulsive detection unit 206 and the impulsive suppression unit 208. The impulsive detection unit 206 is for determining whether the digital signal D inputted by the ADC 204 is larger than a maximum digital signal generated by digitalizing the maximum value of the predetermined range. If yes, it represents the input signal I is affected by impulsive noise and an impulsive alarm signal W is outputted. The impulsive suppression unit 208 receives the digital signal D, suppresses the impulsive noise and outputs a video digital signal Di when receiving the impulsive alarm signal at the same time. If no, the digital signal D is outputted to be the video digital signal Di.

Figure 3A:
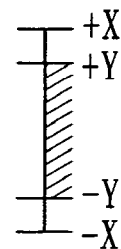
FIG. 3A is a schematic diagram of an input range of the ADC in FIG. 2.

In the embodiment, the gain value of the VGA 202 is adjusted according to the PAPR such that a range of the amplified input signal Ia unaffected by impulsive noise under an ideal condition is smaller than the maximum dynamic input range of the ADC 204. Referring to FIG. 3A, a schematic diagram of an input range of the ADC 204 is shown. The maximum dynamic input range of the ADC 204 is located between +X and −X. By control of the AGC 210, the signal Ia outputted by the VGA 202 as unaffected by impulsive noise can have a smaller predetermined range between +Y and −Y.

Figure 3B:
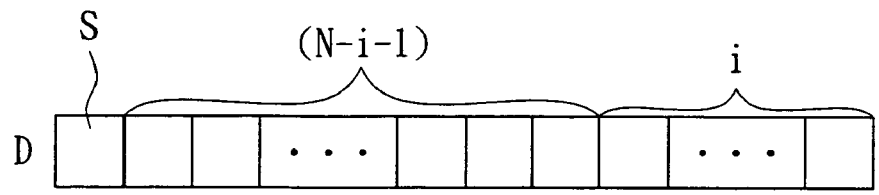
FIG. 3B is a schematic diagram of the digital signal performed by an analog to digital conversion.

Referring to FIG. 3B, a schematic diagram of the digital signal D performed by an analog to digital conversion is shown. The digital signal is designed to have bits 0~N. The most significant bit (MSB) is a sign bit S for denoting a positive or negative symbol. By suitable calibration, the ADC 204 can convert the maximum value of the predetermined range between +Y and −Y to the maximum digital signal, whose i-th to (N−1)-th bits are all 1 and 0-th and (i−1)-th bits are 0. That is, the (N−i−1) bits denoted in FIG. 3B are all 1 and the latter i bits are all 0.

The digital signal converted from the reception signal I unaffected by impulsive noise will be smaller than or equal to the maximum digital signal. Conversely, when the reception signal I is coupled by impulsive noise, the obtained digital signal D may be larger than the maximum digital signal. That is to say, when the i-th to (N−1)-th bits of the digital signal D are all 1 and any arbitrary bit of the 0-th to (i−1)-th bits is 1, it represents the digital signal D is larger than the maximum digital signal.

Therefore, the impulsive detection unit 206 of the embodiment examines whether the digital signal D is larger than the maximum digital signal. If yes, an impulsive noise suppression processing should be performed and the impulsive alarm signal W be sent to the impulsive suppression unit 208.

After receiving the impulsive alarm signal W, the impulsive suppression unit 208 suppresses impulsive noise, for example, by blanking the digital signal D to a minimum value, such as with all bits 0 or by adjusting the digital signal D to an saturation value, that is, the maximum digital signal.

Figure 4:
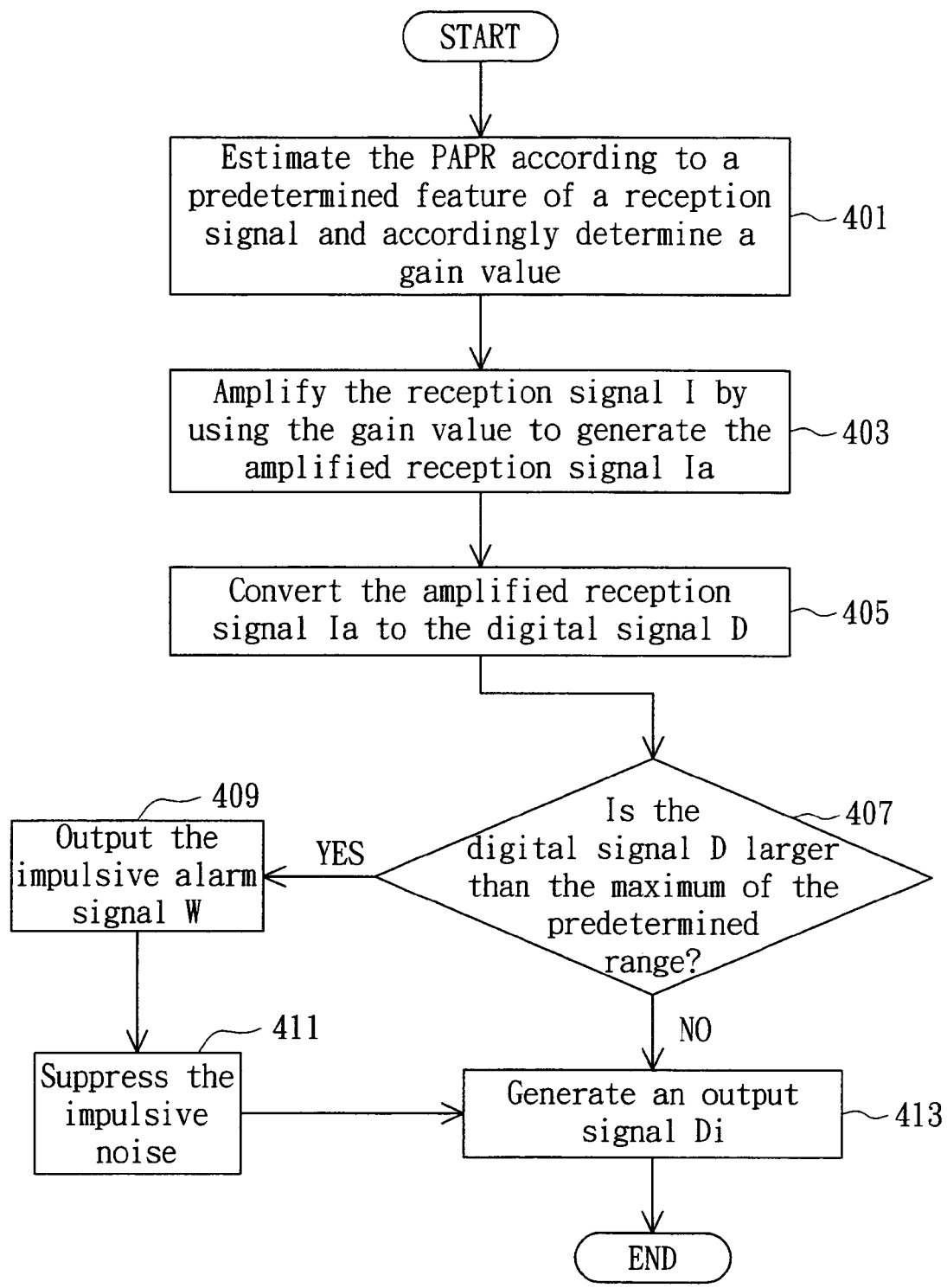
FIG. 4 is a flow chart of a method of suppressing impulsive noise.

FIG. 4 is a flow chart of a method for suppressing impulsive noise. First, in step 401, estimate the PAPR according to a predetermined feature of a reception signal and accordingly determine a gain value. In step 403, receive a signal I and amplify the reception signal I by using the gain value to generate the amplified reception signal Ia. In step 405, convert the amplified reception signal Ia to the digital signal D. Following that, in step 407, determine whether the digital signal D is larger than the maximum digital signal. If yes, go to the step 409 to output the impulsive alarm signal and then suppress the impulsive noise in step 411. If the digital signal D is smaller than the maximum digital signal, go to step 413 to generate an output signal, i.e. the video digital signal D1, directly.

The digital television receiver and impulsive noise suppresser and method thereof disclosed by the above embodiment of invention can effectively detect the affection of impulsive noise and eliminate the impulsive noise. Therefore, quality of images and voices can be effectively improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An impulsive noise suppresser, comprising:
   an automatic gain control unit, for determining a gain value according to a peak-to-average power ratio (PAPR);
   a variable gain amplification unit, for amplifying a reception signal by using the gain value, wherein the gain value is determined such that the amplified reception signal as unaffected by the impulsive noise can have an amplitude range smaller than a predetermined range;
   an impulsive detection unit, coupled to the variable gain amplification unit for determining whether the amplified reception signal is larger than a maximum, value of the predetermined range and outputting an impulsive alarm signal if the reception signal is larger than the maximum value; and
   an impulsive suppression unit, for receiving the amplified reception signal, eliminating the impulsive noise and outputting an output signal as receiving the impulsive alarm signal, wherein, when the impulsive suppression unit receives the impulsive alarm signal, the output signal is the maximum value of the predetermined range.

2. The suppresser according to claim 1, wherein the reception signal is a signal of digital video broadcast-terrestrial (DVB-T) specification.

3. The suppresser according to claim 1, wherein the reception signal is modulated by an orthogonal frequency division multiplexing (OFDM) technique.

4. The suppresser according to claim 1, wherein when receiving the impulsive alarm signal, the impulsive suppression unit blanks the output signal.

5. The suppresser according to claim 1, wherein without receiving the impulsive alarm signal, the impulsive suppression unit uses the digital signal to be the output signal.

6. The suppresser according to claim 1, further comprising an analog to digital conversion unit, coupled to the variable gain amplification unit for digitalizing the amplified reception signal and outputting the digitalized reception signal to the impulsive detection unit and the impulsive suppression unit, wherein the predetermined range is smaller than a maximum dynamic input range of the analog to digital conversion unit.

7. The suppresser according to claim 1, wherein without receiving the impulsive alarm signal, the impulsive suppression unit uses the digital signal to be the output signal.

8. A method for suppressing impulsive noise, applied to a digital television receiver, the method comprising:
   estimating a PAPR and accordingly determining a gain value according to a predetermined feature of a reception signal;
   receiving a reception signal;

amplifying the reception signal by the gain value, wherein the gain value is determined such that the amplified reception signal can have an amplitude range smaller than a predetermined range under an ideal condition that the reception signal is not affected by the impulsive noise;

determining whether the amplified reception signal is larger than a maximum value of the predetermined range and outputting an impulsive alarm signal when the amplified signal is larger than the maximum value; and suppressing the impulsive noise when receiving the impulsive alarm signal and outputting an output signal, wherein when the impulsive alarm signal is received, the output signal is the maximum value of the predetermined range.

9. The method according to claim 8, wherein the reception signal is a signal of DVB-T specification.

10. The method according to claim 8, wherein the reception signal is modulated by an OFDM technique.

11. The method according to claim 8, wherein in the step of outputting the output signal, when the impulsive alarm signal is received, the output signal is blanked.

12. The method according to claim 8, wherein in the step of outputting the output signal, when the impulsive alarm signal is not received, the digital signal is used to be the output signal.

13. An impulsive noise suppresser, comprising:
  an automatic gain control unit, for determining a gain value according to a PAPR;
  a variable amplification unit, for amplifying a reception signal by the gain value, wherein the gain value is determined such that the amplified reception signal has an amplitude range smaller than a predetermined range under the condition that the reception signal is not affected by the impulsive noise;
  an analog to digital conversion unit, for digitalizing the amplified reception signal to generate a digital signal, wherein the predetermined range is smaller than a maximum dynamic input range;
  an impulsive detection unit, coupled to the analog to digital conversion unit for determining whether the digital signal is larger than a maximum digital signal, and outputting an impulsive alarm signal if the digital signal is larger than the maximum digital signal, wherein the maximum digital signal is obtained by digitalizing the maximum value of the predetermined range; and
  an impulsive suppression unit, for receiving the reception signal, suppressing the impulsive noise of the reception signal and outputting an output signal upon receiving the impulsive alarm signal, wherein when the impulsive suppression unit receives the impulsive alarm signal, the output signal is the maximum value of the predetermined range.

14. The suppresser according to claim 13, wherein the reception signal is a signal of DVB-T specification.

15. The suppresser according to claim 14, wherein the reception signal is modulated by an OFDM technique.

16. The suppresser according to claim 14, wherein when receiving the impulsive alarm signal, the impulsive suppression unit blanks the output signal.

* * * * *